(12) United States Patent
Saeki (10) Patent No.: US 7,702,158 B2
(45) Date of Patent: Apr. 20, 2010

(54) IMAGE PROCESSING APPARATUS, IMAGE PROCESSING METHOD AND RECORD MEDIUM FOR THE IMAGE PROCESSING APPARATUS

(75) Inventor: Kazuhito Saeki, Osaka (JP)

(73) Assignee: Keyence Corporation, Osaka (JP)

( * ) Notice: Subject to any disclaimer, the term of this patent is extended or adjusted under 35 U.S.C. 154(b) by 1101 days.

(21) Appl. No.: 10/689,755

(22) Filed: Oct. 21, 2003

(65) Prior Publication Data

US 2004/0136588 A1 Jul. 15, 2004

(30) Foreign Application Priority Data

Oct. 23, 2002 (JP) .......................... P 2002-308006

(51) Int. Cl.
*G06K 9/56* (2006.01)
*G06K 9/40* (2006.01)
(52) U.S. Cl. ....................... 382/205; 382/255
(58) Field of Classification Search .................. None
See application file for complete search history.

(56) References Cited

U.S. PATENT DOCUMENTS 5,058,176 A * 10/1991 Shimazaki et al. .......... 382/132
5,136,661 A * 8/1992 Kobayasi et al. ........... 382/288
5,327,260 A * 7/1994 Shimomae et al. .......... 358/448
5,475,766 A * 12/1995 Tsuchiya et al. ............ 382/144
5,701,179 A * 12/1997 Chatterjee ................... 356/605
6,021,222 A * 2/2000 Yamagata ................... 382/199
6,148,117 A * 11/2000 Lopez et al. ................ 382/279
6,941,007 B1 * 9/2005 Do ............................. 382/145
2002/0141647 A1 * 10/2002 Mitsui ........................ 382/201
2004/0146201 A1 * 7/2004 Sathyanarayana ........... 382/199

FOREIGN PATENT DOCUMENTS

| JP | 07-210687 | 8/1995 |
|----|-----------|--------|
| JP | 11-037724 | 2/1999 |
| JP | 11-316799 | 11/1999 |

* cited by examiner

*Primary Examiner*—Matthew C Bella
*Assistant Examiner*—Alex Liew
(74) *Attorney, Agent, or Firm*—Kilyk & Bowersox, P.L.L.C.

(57) ABSTRACT

Plural window elements are set in one edge window, and edge detection is performed every each the window element, and calculation and determination about its result are made inside an image processing apparatus. A user can freely set a width of the window element and a distance between the adjacent window elements.

21 Claims, 8 Drawing Sheets

IMAGE PROCESSING APPARATUS, IMAGE PROCESSING METHOD AND RECORD MEDIUM FOR THE IMAGE PROCESSING APPARATUS

BACKGROUND OF THE INVENTION

1. Field of the Invention

This invention relates to an image processing apparatus, an image processing method, and a record medium including a program executable on the image processing apparatus.

2. Description of the Related Art

Figure 8:
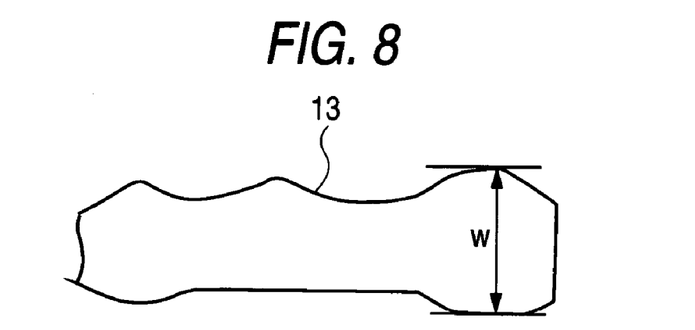
FIG. 8 is a diagram showing an elongated workpiece (for example, cable) illustrated for describing a related-art problem.
Figure 9:
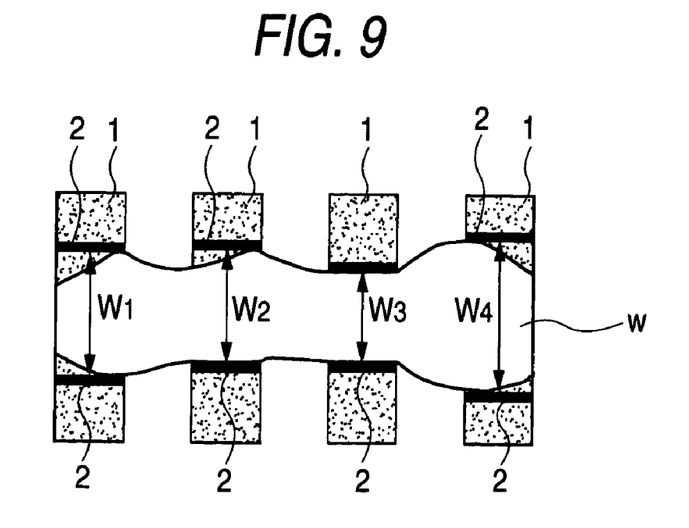
FIG. 9 is a diagram describing an edge width measurement method by a related-art technique.

As one use aspect of an image processing apparatus, it is configured so that edge related information such as an edge position or the maximum edge width about an edge, which a user wishes to obtain, can be calculated by setting an edge window and detecting an edge of a workpiece for detection of variations in workpiece outline. For example, when the maximum edge width W of a workpiece w such as cable shown in FIG. 8 is measured, as shown in FIG. 9, plural edge windows 1 are set and the maximum edge width W4 is decided based on output results of edge widths W1 to W4 between edges 2 and 2 of each the edge window 1. The number of such edge windows 1 varies depending on the image processing apparatus and can be set at, for example, up to 8 to 64.

Figure 10:
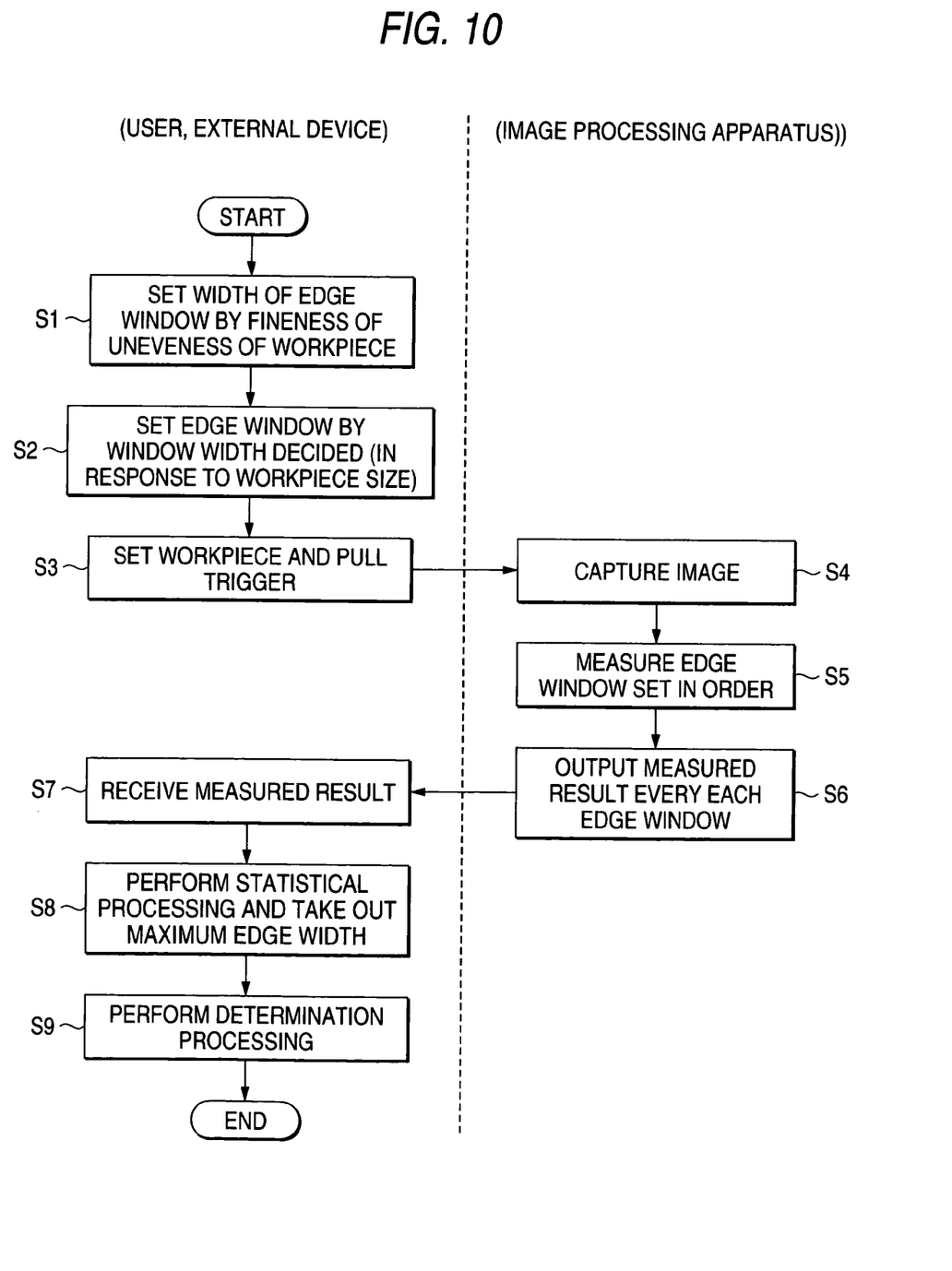
FIG. 10 is a flowchart describing a related-art operating procedure.

FIG. 10 is a flowchart showing a related-art operating procedure including setting of an edge window. Referring to the related-art operating procedure according to this flowchart, in step S1, a user decides a width of an edge window in response to fineness of unevenness of a surface of the workpiece w or size of the workpiece w and an edge window 1 according to the window width decided by the user is set (step S2). When it is necessary to set plural edge windows 1, operations of step S2 are repeated. Next, when the workpiece w is set in an image pickup position and a trigger from the outside is inputted to an image processing apparatus, an image pickup of the workpiece w is performed (step S3).

The image processing apparatus captures image pickup data (step S4), and then measures an edge every the edge window 1 set (step S5), and outputs a measured result every each the edge window 1 to an external device (step S6).

The external device receives the measured result every each the edge window 1 (step S7), and performs statistical processing of these and obtains, for example, the maximum edge width, an edge position, the number of edges, etc. (step S8), and thereby performs determination processing (step S9).

However, in setting of the edge window 1, the setting operation becomes more complicated for a user as the number of edge windows 1 to be set increases. Also, the external device is required for performing statistical processing.

Figure 11:
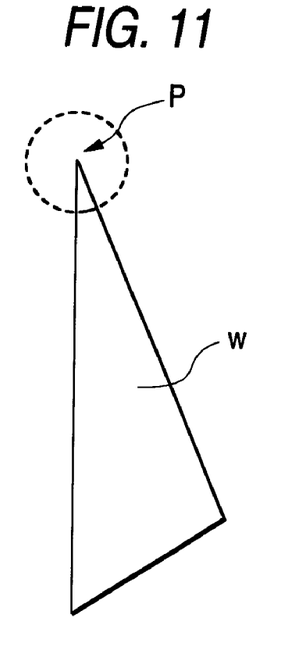
FIG. 11 is a diagram illustrating the workpiece having the tip of an acute angle in which accurate edge detection is difficult in the related-art technique.
Figure 12:
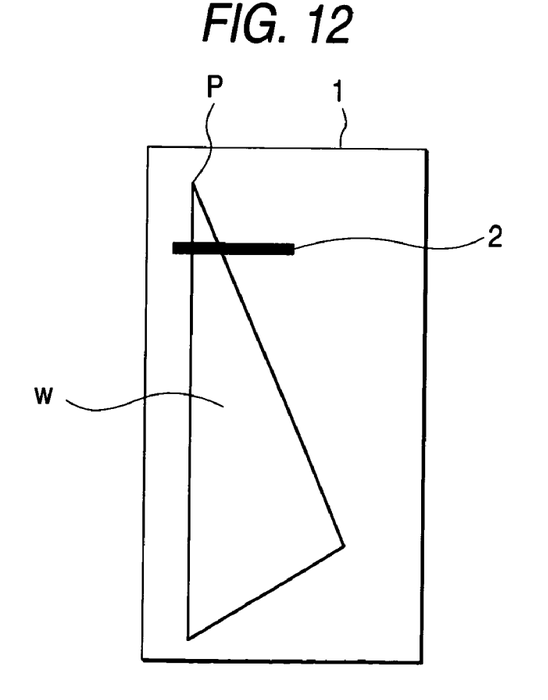
FIG. 12 is a diagram describing a detection result of the case of setting a relatively wide edge window to perform edge detection using the related-art technique with respect to the workpiece having the tip of the acute angle.

Also, in the case of detecting the tip P of the workpiece w having the sharp end as shown in FIG. 11, another problem tends to arise. For example, as shown in FIG. 12, in the case that an edge window 1 in which the entirety of workpiece w having the end of an acute angle is included is set, it becomes difficult to detect the end of the acute angle when the number of pixels read increases in character of a general algorithm of image processing. Therefore, an edge position 2 detected tends to become a position distant from the end of the workpiece w.

Figure 13A:
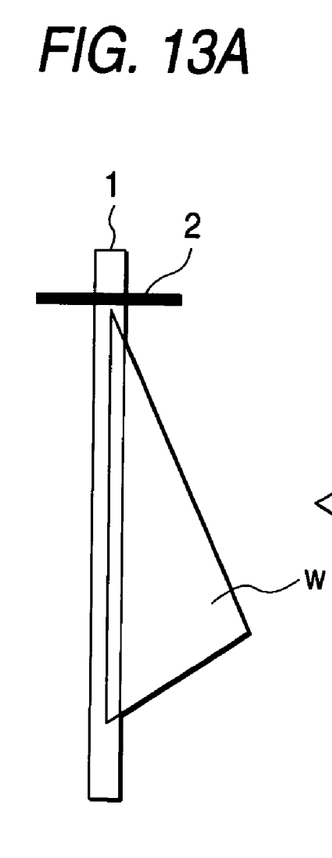
FIGS. 13A and 13B are diagrams describing a problem of the case of setting a relatively narrow edge window using the related-art technique in order to improve accuracy of edge detection of the workpiece having the tip of the acute angle.
Figure 13B:
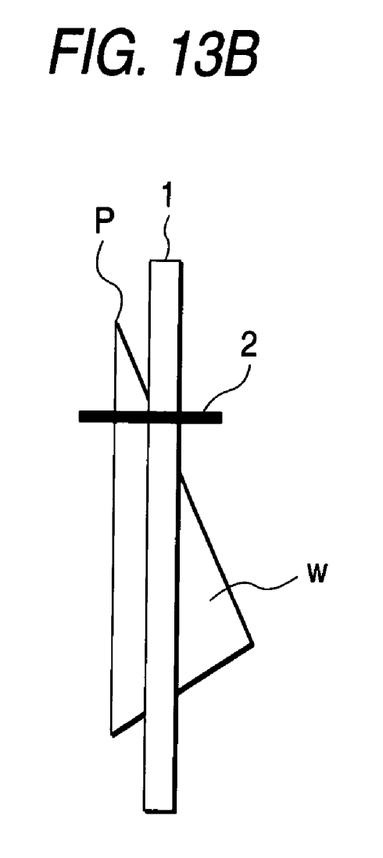

Therefore, a user has to set a narrow edge window 1 as shown in FIG. 13A, but when such a narrow edge window 1 is set, it cannot cope flexibly with variations from an image pickup position of the workpiece w. As shown in FIG. 13B, a new problem that there is a high possibility that the end P of an acute angle deviates from the edge window 1 arises.

SUMMARY OF THE INVENTION

Thus, an object of the invention is to provide an image processing apparatus and an image processing method capable of improving accuracy of edge detection without troubling a user where possible, and a record medium including a program executable on the image processing apparatus.

A further object of the invention is to provide an image processing apparatus and an image processing method capable of coping flexibly with variations in an image pickup position of the workpiece or difference in properties of the workpiece, and a record medium including a program executable on the image processing apparatus.

A further object of the invention is to provide an image processing apparatus and an image processing method without the need to prepare an external device and perform statistical processing about edge detection, and a record medium including a program executable on the image processing apparatus.

In order to accomplish the object above, the following means are adopted. According to the present invention, there is provided an image processing apparatus comprising:

an edge window setting unit for an edge window for detecting an edge of a workpiece;

an element setting unit for setting a plurality of window elements in the one edge window set by said edge window setting unit;

an edge detection unit for scanning each of the window elements and obtaining edges every each the window element; and a calculation unit for obtaining an edge related information from the edges detected by said edge detection unit.

That is, according to the invention, a setting operation with effort of an edge window finishes one time and after capturing image pickup data, the edge window is scanned every window element fragmented. Therefore, even for the workpiece having the sharp tip, an edge of an acute angle can be detected accurately without changing a general algorithm of image processing used in related-art.

Also, the inside of the edge window is fragmented into plural window elements and is scanned every each the window element. Therefore, with respect to edge detection, it can cope flexibly with variations in an image pickup position of the workpiece or difference in properties of the workpiece.

Also, it is easy to internally perform calculation processing of measured results about edges every each the window element. Therefore, there is an advantage that an external device for statistical processing about edge detection is not required.

DETAILED DESCRIPTION OF THE INVENTION

Figure 1:
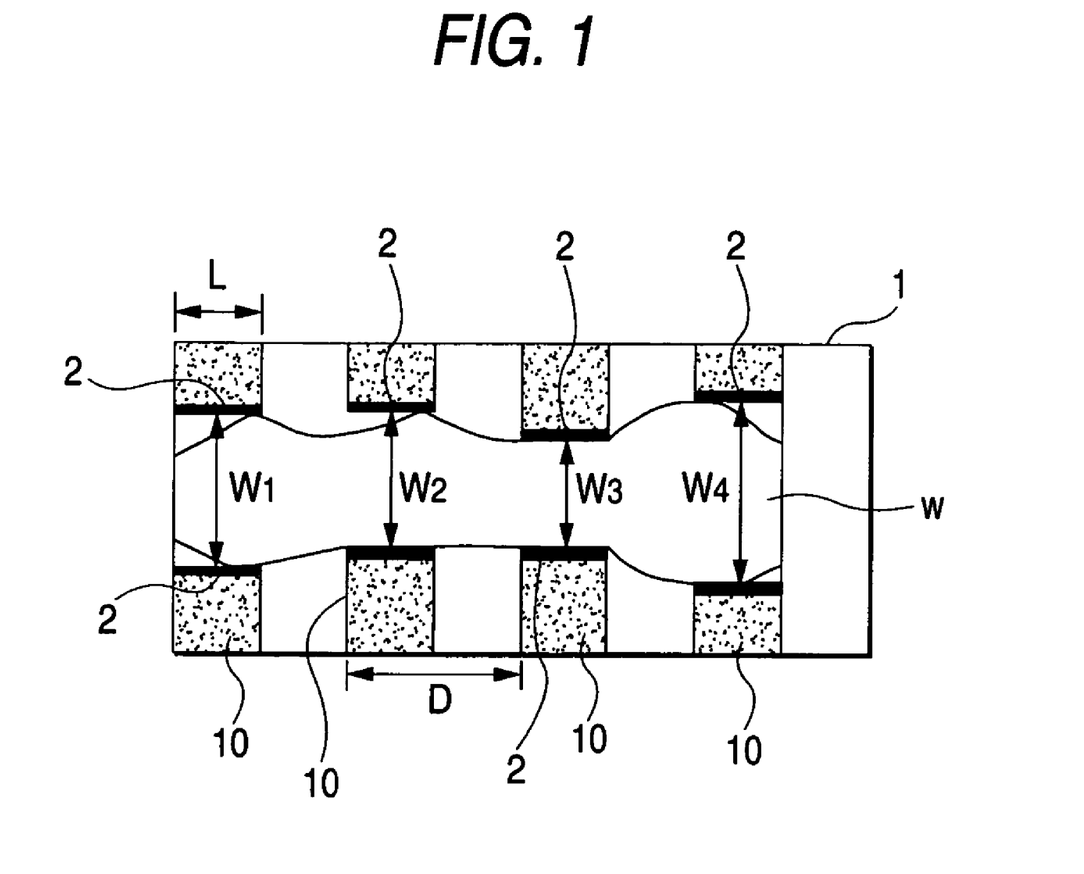
FIG. 1 is a diagram conceptually describing an embodiment of the invention.

An image processing apparatus according to the invention can be applied to measurement of edge related information such as the number of edges, an edge position, an edge width, a gap or a center pitch, which a user wishes to obtain, in connection with edge detection. Referring to one embodiment taking measurement of an edge width as an example, plural window elements 10 (four window elements 10 in an example illustrated) are set in one edge window 1 as shown in FIG. 1 and edge detection is performed every each the window element 10.

It is preferably constructed so that a user can freely set a width L of the window element 10 and a distance D between the adjacent window elements 10 and 10.

For example, with respect to setting of the width L of the window element 10, it may be constructed so that this width can be set by the number of pixels. Alternatively, it may be constructed so that a user selects from the number of pixels preset, for example, three stages of coarse (width L is large), fine (width L is small) and moderate (width L is in a state between coarse and fine) and thereby the width L of the window element 10 can be set.

In the distance D between the adjacent window elements 10 and 10, for example, it may be constructed so that a distance from start coordinates of one window element 10 to start coordinates of the next window element 10 can be set.

By comparing the sizes of edge widths W detected every each the window element 10 inside the image processing apparatus, the maximum value and the minimum value are obtained or the average value is calculated and as necessary, the result is outputted to an external device.

Figure 2:
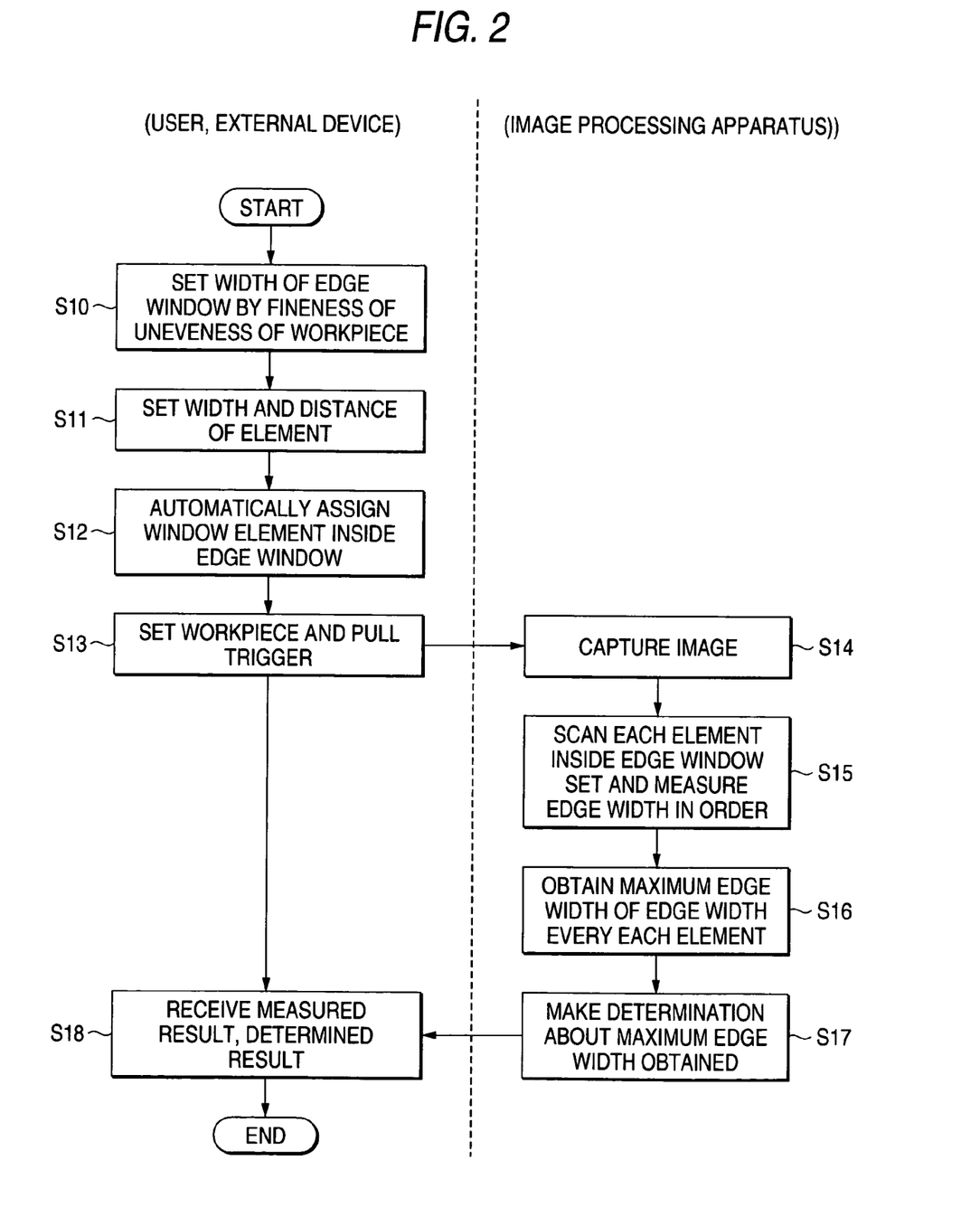
FIG. 2 is a flowchart describing one example of an operating procedure of the embodiment of the invention.

FIG. 2 is a flowchart showing an operating procedure of a preferred embodiment. Referring to an operating procedure about detection of an edge width as illustration according to this flowchart, a user decides a width of an edge window 1 in response to fineness of unevenness of a surface of a workpiece w or size of the workpiece w in step S10.

In the next step S11, the user sets a width L and a distance D of window elements 10 and in step S12, plural window elements 10 are automatically assigned inside the edge window according to the width L and the distance D set by the user. Then, the workpiece w is set in an image pickup position and a trigger from the outside is inputted to an image processing apparatus and an image pickup of the workpiece w is performed (step S13).

The image processing apparatus captures image pickup data (step S14), and then measures edge widths W every each the window element 10 inside the edge window 1 set (step S15), and obtains the maximum edge width W of the edge widths W acquired in each the window element 10 (step S16). Then, a determination about this maximum edge width W is made. For example, when the maximum edge width is out of specifications, a determination of NG is made (step S17) and also when necessary, the measured result and/or determined result are outputted to an external device (step S18).

Figure 3:
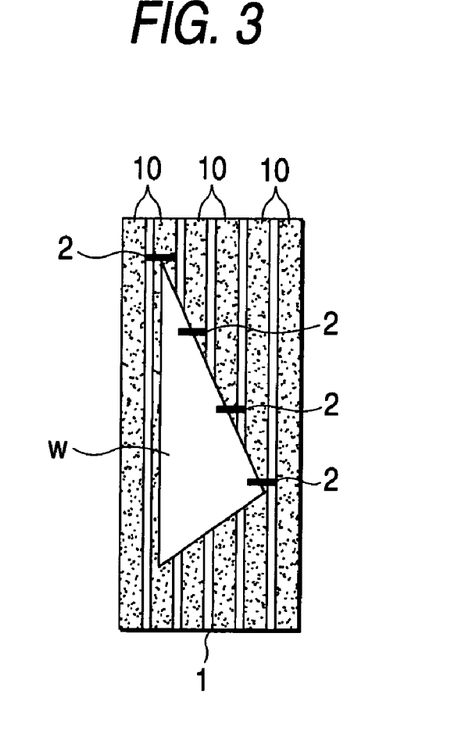
FIG. 3 is a diagram describing the fact that the invention can preferably be applied to the workpiece having the tip of an acute angle.
Figure 4:
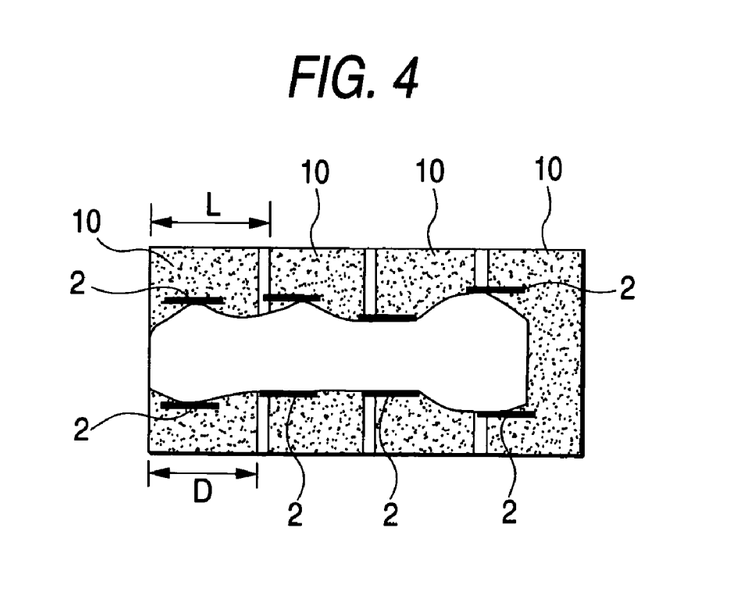
FIG. 4 is a diagram describing the fact that window elements overlapping mutually can be set in the embodiment of the invention.

According to the embodiment of the invention, as shown in FIG. 3, an edge of an acute angle of the workpiece w having the sharp tip can also be detected accurately. Also, by setting a distance D between adjacent window elements 10 and 10 smaller than a width L of a window element 10 (D<L), as shown in FIG. 4, the window elements 10 overlapping mutually can be set to perform edge detection of the workpiece w without interruption.

Figure 5:
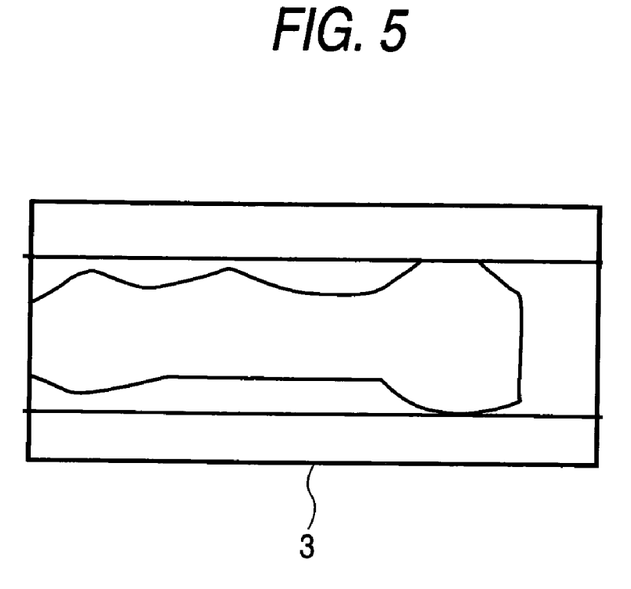
FIG. 5 is a diagram describing one example of display of edges detected in the embodiment of the invention.
Figure 6:
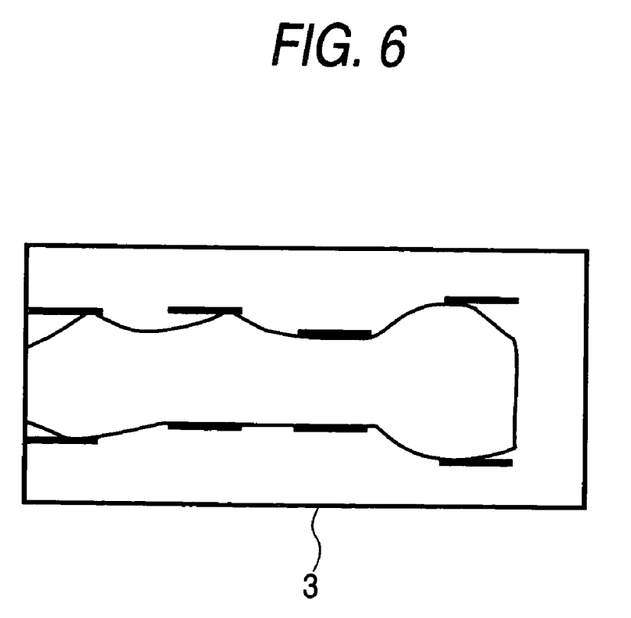
FIG. 6 is a diagram describing another example of display of edges detected in the embodiment of the invention.
Figure 7:
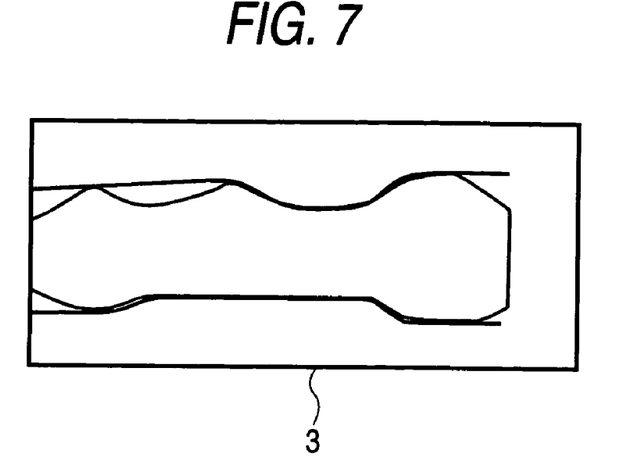
FIG. 7 is a diagram describing the other example of display of edges detected in the embodiment of the invention.

With respect to display of the edges detected, for example, when the maximum edge width is measured, it may be constructed so as to display only the result as shown in FIG. 5 and also, it may be constructed so as to perform display every each window element 10 as shown in FIG. 6. Also, it may be constructed so as to perform display in a state in which ranges between edge displays every each window element 10 are complemented by curved lines as shown in FIG. 7.

With respect to automatically assigning plural window elements 10 inside an edge window 1, for example, it may be constructed so that a user only specifies the number of window elements 10 and thereby a width L and a distance D of the elements 10 in response to this number of elements 10 are calculated and the window elements 10 are assigned inside the edge window 1 based on its result. Also, it may be constructed so that a user specifies a width L of the window element 10 and thereby a distance D in response to this width L is calculated and the window elements 10 are assigned inside the edge window 1 based on its result. When a distance D between the window elements 10 is substantially calculated inside such an image processing apparatus, it is preferable to internally calculate the distance D so that the window elements 10 are always present in one end and the other end (left end and right end in the drawing) of the edge window 1.

Also, as described in the embodiment, an image processing apparatus into which a program for executing the invention is previously incorporated may be provided for a user, or it may be constructed so that, for example, CD-ROM for recording a program capable of being installed on an image processing apparatus, namely capable of being read by the image processing apparatus is provided for a user who has already acquired the image processing apparatus.

What is claimed is:

1. An image processing apparatus comprising:
    an edge window setting unit for setting an edge window for detecting an edge of a workpiece;
    an element setting unit for selectively setting a plurality of window elements in the one edge window set by said edge window setting unit, such that the window elements are capable of mutually overlapping in the width direction of the edge window;
    an edge detection unit for scanning each of the window elements and obtaining edges for each window element; and
    a calculation unit for obtaining edge related information from the edges detected by said edge detection unit and for calculating width between the edges in a height direction in each of the window elements and for obtaining at least one of maximum width, minimum width, or average value in the width detected in each of said window elements, wherein said edge window set by the edge window setting unit has a height that is equal to the height of each of the plurality of window elements wherein said plurality of window elements has a width and there is a distance between the beginning of each of the said window elements, wherein said width or said distance are assigned automatically inside said edge window by specifying the number of window elements by the user.

2. An image processing apparatus as defined in claim 1, wherein said element setting unit sets the plurality of window elements based on a width of the window element which is set by a user.

3. An image processing apparatus as defined in claim 1, wherein said element setting unit sets the plurality of window elements based on a distance between the adjacent window elements which is set by a user.

4. A record medium including a program executable on an image processing apparatus, the program comprising instructions having:
  a first function of setting an edge window for detecting an edge of a workpiece;
  a second function of selectively setting a plurality of window elements in the one edge window set by said first function, such that the window elements are capable of mutually overlapping in the width direction of the edge window;
  a third function of scanning each of the window elements and obtaining edges for each window element; and
  a fourth function of obtaining edge related information from the edges detected in the third function and for calculating width between the edges in a height direction in each of the window elements and for obtaining at least one of maximum width, minimum width, or average value in the width detected in each of said window elements,
  wherein said edge window has a height that is equal to the height of each of the plurality of window elements,
  wherein said plurality of window elements has a width and there is a distance between the beginning of each of the said window elements, wherein said width or said distance are assigned automatically inside said edge window by specifying the number of window elements by the user.

5. An image processing method performed by an image processing apparatus comprising:
  setting an edge window for detecting an edge of a workpiece;
  selectively setting a plurality of window elements in the one edge window, such that the window elements are capable of mutually overlapping in the width direction of the edge window;
  scanning each of the window elements and obtaining edges for each window element; and
  obtaining edge related information from the edges detected and for calculating width between the edges in a height direction in each of the window elements and obtaining at least one of maximum width, minimum width, or average value in the width detected in each of said window elements,
  wherein said edge window has a height that is equal to the height of each of the plurality of window elements,
  wherein said plurality of window elements has a width and there is a distance between the beginning of each of the said window elements, wherein said width or said distance are assigned automatically inside said edge window by specifying the number of window elements by the user.

6. An image processing method as defined in claim 5, wherein said element setting step includes setting the plurality of window elements based on a width of the window element which is set by a user.

7. An image processing method as defined in claim 5, wherein said element setting step includes setting the plurality of window elements based on a distance between the adjacent window elements which is set arbitrarily by a user.

8. The image processing apparatus of claim 1, wherein when said element setting unit sets the plurality of window elements inside said edge window, a setting is performed so that the window elements are always present in one end and the other end of the edge window.

9. The image processing method of claim 5, wherein said plurality of window elements has a width and there is a distance between said window elements, wherein said width and said distance are assigned automatically inside said edge window by specifying the number of window elements by the user.

10. The image processing method of claim 5, wherein when said element setting unit sets the plurality of window elements inside said edge window, a setting is performed so that the window elements are always present in one end and the other end of the edge window.

11. An image processing apparatus as defined in claim 1, wherein said element setting unit sets the number of window elements and width of each window element.

12. An image processing apparatus as defined in claim 1, wherein said edge window comprises two opposing ends and the element setting unit arranges the window elements at both ends of the edge window.

13. An image processing apparatus comprising:
  an edge window setting unit for setting an edge window for detecting an edge of a workpiece;
  an element setting unit for selectively setting a plurality of window elements in the one edge window set by said edge window setting unit, wherein a user defines at least one of the number of window elements and the width of each of the window elements, and the height of the edge window is equal to the height of the plurality of window elements;
  an edge detection unit for scanning each of the window elements and obtaining edges for each window element; and
  a calculation unit for obtaining edge related information from the edges detected by said edge detection unit and for calculating width between the edges in a height direction in each of the window elements, and for obtaining at least one of maximum width, minimum width, or average value in the width detected in each of said window elements,
  wherein said plurality of window elements has a width and there is a distance between the beginning of each of the said window elements, wherein said width or said distance are assigned automatically inside said edge window by specifying the number of window elements by the user.

14. An image processing apparatus as defined in claim 13, wherein said at least one window element has a height equal to the height of the edge window set by said edge window setting unit.

15. An image processing apparatus as defined in claim 13, wherein said element setting unit sets the number of window elements and width of each window element.

16. An image processing apparatus as defined in claim 13, wherein said at least one window element is at least two window elements and the element setting unit sets the at least two window elements such that the at least two window elements are mutually overlapping in the width direction of the edge window.

17. An image processing apparatus as defined in claim 13, wherein said edge window comprises two opposing ends and the element setting unit arranges the window elements at both ends of the edge window.

18. An image processing apparatus comprising:
   an edge window setting unit for setting an edge window for detecting an edge of a workpiece;
   an element setting unit for selectively setting a plurality of window elements in the one edge window set by said edge window setting unit, such that the window elements are capable of mutually overlapping in the width direction of the edge window;
   an edge detection unit for scanning each of the window elements and obtaining edges for each window element; and
   a calculation unit for obtaining an edge related information from the edges detected by said edge detection unit and for calculating width between the edges in a height direction in each of the window elements and for obtaining at least one of maximum width, minimum width, or average value in the width detected in each of said window elements,
   wherein a user selects a width of each window element, and the user selects a distance from a start coordinate of a first window element to a start coordinate for each additional window element,
   wherein said plurality of window elements has a width and there is a distance between the beginning of each of the said window elements, wherein said width or said distance are assigned automatically inside said edge window by specifying the number of window elements by the user.

19. The image processing apparatus as defined in claim 18, wherein said element setting unit sets the plurality of window elements based on the distance between the start coordinates of adjacent window elements.

20. The image processing apparatus of claim 1, wherein a separate maximum width is individually obtained for each of the window elements.

21. The image processing apparatus of claim 20, wherein the overall maximum width from all of the separate maximum widths is obtained.

* * * * *